US008959241B2

(12) United States Patent
Gupta

(10) Patent No.: US 8,959,241 B2
(45) Date of Patent: Feb. 17, 2015

(54) METHOD AND APPARATUS FOR PERFORMING SERVER-SIDE SPLICING FOR LIVE STREAMING MEDIA

(75) Inventor: Piyush Gupta, Pitampura (IN)

(73) Assignee: Adobe Systems Incorporated, San Jose, CA (US)

( * ) Notice: Subject to any disclaimer, the term of this patent is extended or adjusted under 35 U.S.C. 154(b) by 162 days.

(21) Appl. No.: 13/555,263

(22) Filed: Jul. 23, 2012

(65) Prior Publication Data
US 2014/0025836 A1   Jan. 23, 2014

(51) Int. Cl.
G06F 15/16 (2006.01)

(52) U.S. Cl.
USPC ........................................................ 709/231

(58) Field of Classification Search
None
See application file for complete search history.

(56) References Cited

U.S. PATENT DOCUMENTS

| 7,371,540 | B2 * | 5/2008 | Barber | 435/69.1 |
|---|---|---|---|---|
| 7,416,849 | B2 * | 8/2008 | Allen et al. | 435/7.1 |
| 7,514,594 | B2 * | 4/2009 | Askew et al. | 800/18 |
| 7,692,065 | B2 * | 4/2010 | Harper et al. | 800/298 |
| 8,039,690 | B2 * | 10/2011 | Harper et al. | 800/298 |
| 8,335,266 | B2 * | 12/2012 | Liu et al. | 375/240.26 |
| 8,543,724 | B2 * | 9/2013 | Brelay et al. | 709/233 |
| 2006/0075449 | A1 * | 4/2006 | Jagadeesan et al. | 725/113 |
| 2009/0003432 | A1 * | 1/2009 | Liu et al. | 375/240.01 |
| 2009/0217318 | A1 * | 8/2009 | VerSteeg et al. | 725/32 |
| 2011/0271092 | A1 * | 11/2011 | Brelay et al. | 713/150 |
| 2012/0137015 | A1 * | 5/2012 | Sun | 709/231 |
| 2012/0140633 | A1 * | 6/2012 | Stanwood et al. | 370/235 |
| 2012/0317304 | A1 * | 12/2012 | Masuda | 709/231 |
| 2013/0042016 | A1 * | 2/2013 | Perkuhn et al. | 709/231 |
| 2013/0198335 | A1 * | 8/2013 | Goel et al. | 709/219 |
| 2013/0208811 | A1 * | 8/2013 | Liu et al. | 375/240.26 |
| 2013/0282890 | A1 * | 10/2013 | Ma et al. | 709/224 |

* cited by examiner

Primary Examiner — Ninos Donabed
(74) Attorney, Agent, or Firm — Keller Jolley Preece

(57) ABSTRACT

A method and apparatus for performing server-side splicing for live streaming media comprises receiving a request for media content from a client computer; accessing a media playlist comprising a plurality of universal resource identifiers (URIs) for each of a plurality of media content segments and consecutive sequence numbers defining an order in which the plurality of media content segments are to be viewed; accessing at least one additional content playlist for additional content to be spliced into the media content to be viewed; replacing a plurality of URIs of the media playlist with the URIs of the at least one additional content playlist to create a modified media playlist; and correcting a gap in sequence numbers that occurs in the modified media playlist when the number of URIs of the at least one additional content playlist is less than the plurality of URIs of the media playlist that are replaced.

20 Claims, 3 Drawing Sheets

METHOD AND APPARATUS FOR PERFORMING SERVER-SIDE SPLICING FOR LIVE STREAMING MEDIA

BACKGROUND OF THE INVENTION

1. Field of the Invention

Embodiments of the present invention generally relate to HyperText Transfer Protocol (HTTP) Live Streaming (HLS) splicing and, more particularly, to a method and apparatus for performing server-side splicing for live streaming media.

2. Description of the Related Art

HyperText Transfer Protocol (HTTP) Live Streaming (HLS) is an HTTP-based media streaming communications protocol for downloading a media stream onto a client computer. HLS operates by dividing an overall stream of media content into a sequence of small HTTP-based file downloads usually five to ten seconds in duration, each download loading one or more short segments of an overall stream. At the start of the streaming session, HLS client downloads an extended M3U (m3u8) playlist containing an ordered list of media Uniform Resource Identifiers (URIs) and information tags. The playlist is a series of media content segments. Each media content segment is specified by a media URI and the tags that apply to it. An EXTINF tag specifies the duration of the media content segment. Each media URI in a playlist has a unique integer sequence number. The sequence number of a URI is equal to the sequence number of the URI that preceded it plus one. The sequence number of the first URI is equal to the value of the EXT-X-MEDIASEQUENCE tag, which is listed in the m3u8 before any segment URI entry. Typically, a sliding window is maintained in the HLS playlist where one or more segment URI entries are appended to the playlist periodically and one or more segment entries are deleted from the top. When any entry is deleted from the top of the m3u8, the EXT-X-MEDIASEQUENCE is updated to equal the sequence number of the first media segment entry.

A common technique of inserting additional content, typically advertising, into a live media stream is called "splicing". Splicing involves replacing some of the media content segments in a live media stream with new content. For example, during a live sporting event, such as tennis, the players take breaks between each game or between sets. These breaks in the play are opportunities to present advertising to viewers. More specifically, the breaks may correspond to one or more sequential media content segments being presented to the viewers of the live media stream, and therefore these sequential media content segments can be replaced in the live media stream with advertising. A "splice out" point is the point in the live media stream where the media content stream stops and the advertisement content stream begins, thereby replacing the media content with advertising content in the stream that follows the splice-out point. A "splice-in" point is the point in the stream where streaming of the advertisement segments ends and streaming of the media content segments begins again. Advertisements have playlists similar to the media content. Splicing involves replacing the segment URIs in the HLS playlist (m3u8) that correspond to the media content with the segment URIs that correspond to the advertisement content. The sequence number of the media segment, immediately after the splice-in point, will be different in a spliced playlist if the number of main content segments replaced does not equal the number of advertisement segments inserted. Another complication is that these offsets in sequence numbering may not be the same for different client-target-groups, as these client-target-groups could potentially be served with a different set of advertisements.

It is important to keep the sequence number of the media segment just after the splice-in point unaffected. If the sequence number of the media segment just after the splice-in point is changed, the media splicer will need to remember all such differences that were incurred due to all splicing done so far, even for the advertisements that have been spliced in have moved out of the m3u8's sliding window. Otherwise, if, for example, two media splicers start at different points in time and even if they replace ad breaks with the same set of advertisements, since the second splicer did not process some of the ad breaks that the first splicer had previously processed, it is possible that the sequence numbers in the m3u8, generated from the two splicers, will not match and an HLS client will find a jump or lag in the sequence number when it switches to another server for a stream playback.

One solution is to require the advertisement playlist to contain the same number of URIs as the number of media content entries to be replaced in the m3u8. This causes difficulties in fully utilizing HTTP caching of the advertisement content because the way the advertisement may be broken up is different across different streams. Another solution is to keep the current state of client interactions in a client session cookie, which can then be utilized to create a final m3u8; however, the final m3u8 generated by this technique will not be sharable across different clients and will not be cacheable, thereby not utilizing the full capabilities of HTTP. Another solution is to provide client-side splicing. Here, the media content m3u8 and the advertisement playlist are provided to a client application. The client application will replace main content URIs with advertisement URIs in order to generate an m3u8 consumable by the clients' video-player. This approach requires that the content publishers derive their client applications from a predefined software development kit and will not work when a client is a browser.

Thus, there is a need for a method and apparatus for performing server-side splicing for live streaming media.

SUMMARY

Embodiments of the invention generally relate to a method and apparatus for performing server-side splicing for live streaming media. The method and apparatus comprise receiving a request for media content from a client computer. The method and apparatus access a media playlist comprising a plurality of universal resource identifiers (URIs), wherein the media playlist comprises a universal resource identifier (URI) for each of a plurality of media content segments and consecutive sequence numbers defining an order in which the plurality of media content segments are to be viewed. The method and apparatus then access at least one additional content playlist for additional content to be spliced into the media content to be viewed. Some URIs of the media playlist are replaced with URIs of the at least one additional content playlist to create a modified media playlist. A gap in the sequence numbers that occurs in the modified media playlist when the number of URIs of the at least one additional content playlist is less than the plurality of URIs of the media playlist that are replaced is corrected.

Figure 1:
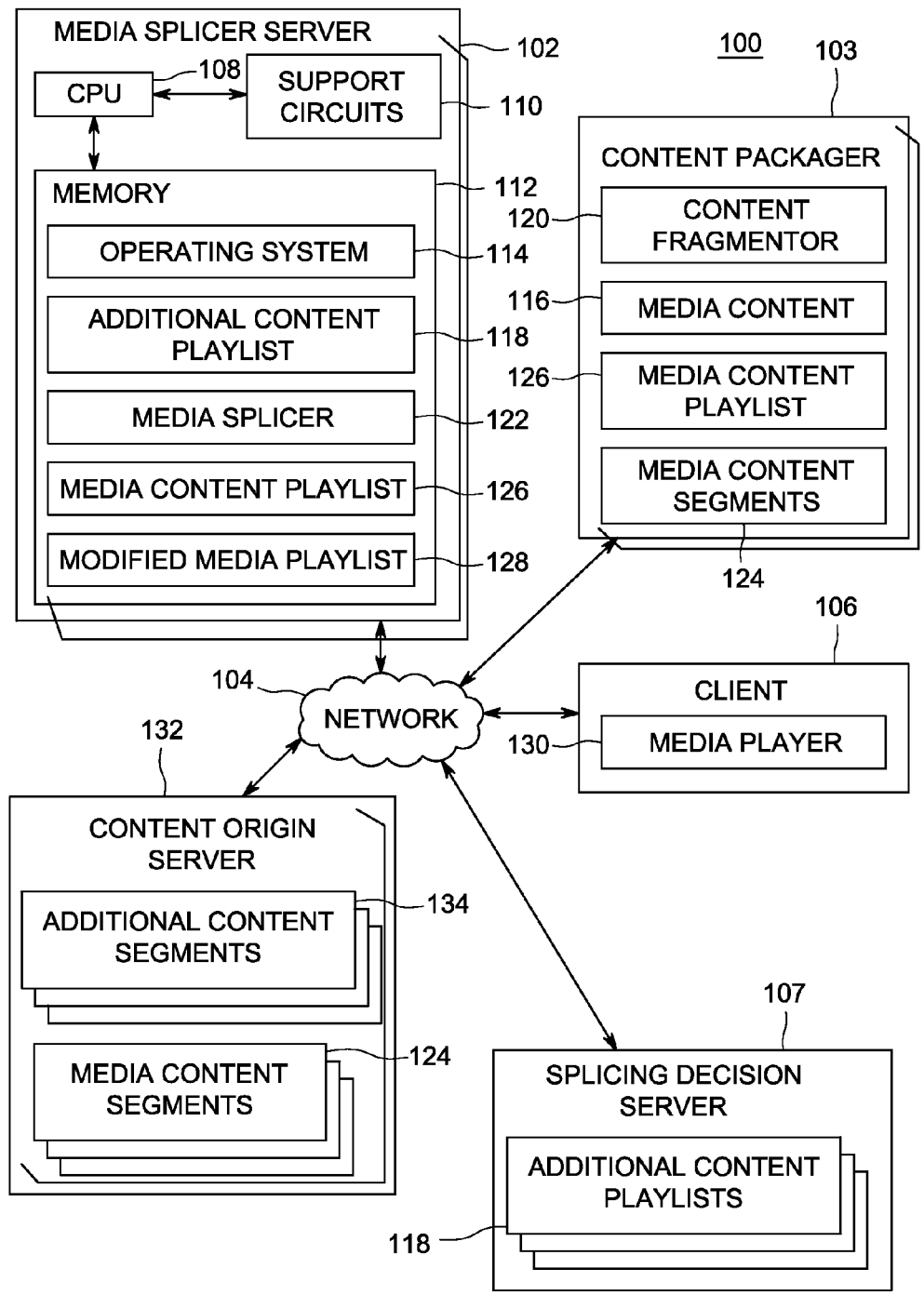
FIG. 1 depicts a block diagram of a system for performing server-side splicing for streaming media content, according to one or more embodiments.

While the method and apparatus is described herein by way of example for several embodiments and illustrative drawings, those skilled in the art will recognize the method and apparatus for performing server-side splicing for live streaming media is not limited to the embodiments or drawings described. It should be understood that the drawings and detailed description thereto are not intended to limit embodiments to the particular form disclosed. Rather, the intention is to cover all modifications, equivalents and alternatives falling within the spirit and scope of a method and apparatus for performing server-side splicing for live streaming media as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Embodiments of the present invention provide a method and apparatus for performing server-side splicing for live streaming media. A request is received from a client for media content. The media content is segmented into a series of small media content segments of equal duration in order for a target duration to be calculated. The target duration is the maximum allowable duration of a media content segment delivered to the client. HLS requires that the target duration be greater than or equal to the duration of any media content segment. The present invention defines the target duration to be twice the duration of an individual media content segment. Each media content segment is saved in a separate file. An index file is created containing the locations (universal reference indicators (URIs)) of the individual media content segments in addition to sequence numbers defining an order in which the media content segments are to be played. The index file is used to track the location of the media content segment. Media content segments are typically saved in MPEG2-TS format as .ts files and index files are typically saved as .m3u8 playlists.

In some embodiments, an advertisement playlist is selected from a plurality of available advertisements m3u8 playlists, herein referred to as AD playlists. An AD playlist contains information about the advertisement, including the length of the advertisement and a number of segments that make up the advertisement. Although exemplary embodiments of this invention refer to splicing advertisements, any type of media content may be spliced into the streaming media content. When an AD playlist is selected for splicing, the method determines a splice-out point where the media content stops and replacement by the advertisement content is to begin. Further, the method determines a splice-in point, where replacement by the advertisement stops and the media content resumes. The splice-out or splice-in points are typically signaled inside the m3u8 using custom tags. For example, an EXT-X-CUE tag is a tag whose location marks the splice-out point and contains a duration attribute. For each splice point, if the splice point is not aligned with a segment boundary, a content fragmentor splits the media content segments that contain the splice points at the splice point. One part of the split segment before the splice-out point is merged with an adjacent segment immediately preceding the split segment in the media playlist and the part of the split segment after the splice-in point is merged with an adjacent segment immediately following the split segment in the media playlist. Because each segment was half the duration of the target duration, any part of a segment that is merged with an adjacent segment will always be shorter in duration than the target duration. The method then replaces the media content segment entries in the m3u8 playlist with advertisement segment entries from the AD playlist. If the end of the advertisement (at the splice-in point) lies inside a media content segment and the number of advertisement segments is less than the number of media content segments that were replaced, the sequence numbers will not be consecutive and must be adjusted. In one embodiment, the sequence numbers are adjusted by adding multiple segment entries immediately following the splice-in point. In some embodiments, segment entries of EXTINF 0.001, which define the duration of the segment, are added to the m3u8 playlist and all point to the same dummy fragment URI that does not contain any audio or video data. In some embodiments, multiple segment entries are added where each entry refers to the same segment with appropriate byte-range offsets applied. The method then sends the final spliced m3u8 playlist to the client.

Advantageously, embodiments of the invention enable the use of multiple server assemblies and ensure that the output is consistent by compensating for sequence number offsets due to advertisement replacement in the live stream. For example, a first assembly may comprise a first packager connected to a first media splicer server and a first content origin server. A second assembly may comprise a second packager connected to a second media splicer server and a second content origin server. A client is given a variant playlist comprising URLs from both media splicer servers. A client may start fetching an m3u8 from the first media splicer server for a bit rate chosen on the basis of a current bandwidth or download speed available. Should the first media splicer server become unavailable, the playback of the m3u8 will be seamless as the client switches over to the second media splicer server for getting updates in the m3u8. During the switchover, the sequence numbers will be the same between m3u8s served from the two media splicer servers.

Various embodiments of a method and apparatus for performing server-side splicing for live streaming media are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description that follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 depicts a block diagram of system 100 for performing server-side splicing of live streaming media, according to one or more embodiments. The system 100 comprises a media splicer server 102, a client 106, a content packager 103, a splicing decision server 107, and a content origin server 132 communicatively coupled via a network 104. The media splicer server 102 comprises a Central Processing Unit (CPU) 108, support circuits 110, and a memory 112. The CPU 108 may comprise one or more commercially available microprocessors or microcontrollers that facilitate data processing and storage. The various support circuits 110 facilitate the operation of the CPU 108 and include one or more clock circuits, power supplies, cache, input/output circuits, and the like. The memory 112 comprises at least one of Read Only Memory (ROM), Random Access Memory (RAM), disk drive storage, optical storage, removable storage and/or the like. The memory 112 comprises an Operating System (OS) 114, at least one additional content playlist 118, a media splicer 122, a media content playlist 126, and a modified media playlist 128. The operating system 114 may comprise various commercially known operating systems. The content packager 103 may be any packager of live streaming media, such as ADOBE® Flash Media Server, provided by Adobe Systems, Incorporated of San Jose, Calif., capable of packaging live streaming media and providing output in HLS format.

A plurality of content origin servers 132 comprises a plurality of additional content segments 134 and media content segments 124. The client 106 comprises a media player 130. The media player 130 may be any HTTP Live Streaming (HLS) client, such as APPLE® iOS devices (iPad, iPhone, iPod Touch), QuickTime player in OSX, ROKU® Digital Media Player, or any media player capable of HTTP Live Streaming.

The content packager 103 comprises a content fragmentor 120, media content 116, a media content playlist 126, and media content segments 124.

The splicing decision server 107 comprises a plurality of additional content playlists 118. The content fragmentor 120 on the content packager 103 divides the media content 116 into the media content segments 124. The content fragmentor 120 also creates a media content playlist 126 containing Universal Reference Indicators (URIs) that define the locations of the media content segments 124 on the content origin server 132. The media content playlist 126 contains sequence numbers that define the order in which the media content segments 124 are to be played. The content packager periodically sends a media content playlist 126 to the media splicer server 102 and sends the media content segments 124 to the content origin server 132.

When the media player 130 sends a request to the media splicer server 102 for a media content playlist 126, the media splicer 122 accesses the media content playlist 126, requests and receives at least one additional content playlist 118 for a selected additional content to splice into the media content 116. The at least one additional content playlist 118 is received from the splicing decision server 107. Although additional content may be any type of content that can be spliced into the live media, exemplary embodiments of the present invention discuss the additional content as a type of advertising. The at least one additional content playlist 118 is selected based on various parameters such as time-of-day, geographical region of the client, theme of the media content, and the like. A requirement of the selected additional content playlist 118 is that the number of segment entries in the at least one additional content playlist 118 must be less than or equal to the number of media content entries that are to be replaced.

The media splicer 122 determines the point in a media content segment 124 where the media content stops and the advertisement begins to replace the media content, this point being called the splice-out point. The splice-out and splice-in points are typically signaled inside the media content playlist 126 using custom tags. For example, an EXT-X-CUE tag is a tag whose location marks a splice-out point and contains a duration attribute. If the splice-out point does not coincide with the beginning of a media content segment 124, the media content segment 124 that contains the splice out point is divided into two parts by the content fragmentor 120. The content fragmentor 120 merges the part of the media content segment 124 located before the splice-out point with the last full media content segment 124 immediately preceding the splice-out point. The content fragmentor 120 also merges part of the media content segment 124 located after the splice-in point is merged with the first full media content segment 124 immediately following the splice-in point. The media splicer 122 then replaces the media content segment entries in the m3u8 playlist with the advertisement segment entries from the at least one additional content playlist 118.

If the number of advertisement segment entries in the received at least one additional content playlist 118 is less than the number of media content segment entries that were replaced, a workflow is required to correct the sequence numbering. In one embodiment, multiple segment entries are added to the modified media playlist 128 that correspond to segments that are created from the media content segment 126 that immediately followed the splice-in point. The media content segment 126 is split into smaller segments. Each time the media content segment 126 is split, an additional sequence number is created. The media content segment 126 is repeatedly split until an appropriate number of sequence numbers is created. In another embodiment, a dummy media content segment is generated which does not contain any audio or video. Media content segment entries of EXTINF 0.001 (of duration 0.001) are added that point to the dummy segment URI. In yet another embodiment, multiple segment entries are added where each entry refers to the same segment with appropriate byte-range offsets applied. This list of different byte-range-offsets may be provided with the media content 116. The modified media playlist 128 is then sent to the client 106 for viewing on the media player 130.

In some embodiments, there are multiple server assemblies, meaning there are multiple media splicer server 102, content packager 103, content origin server 132 groups serving a client 106. A client may be given a variant playlist comprising URLs from multiple media splicer servers 102. Alternatively, a client may start fetching an m3u8 from the first media splicer server 102 for a bit rate chosen on the basis of a current bandwidth or download speed available. Should the first media splicer server 102 become unavailable, the playback of the m3u8 will be seamless as the client switches over to the second media splicer server 102 for getting updates in the m3u8.

Figure 2:
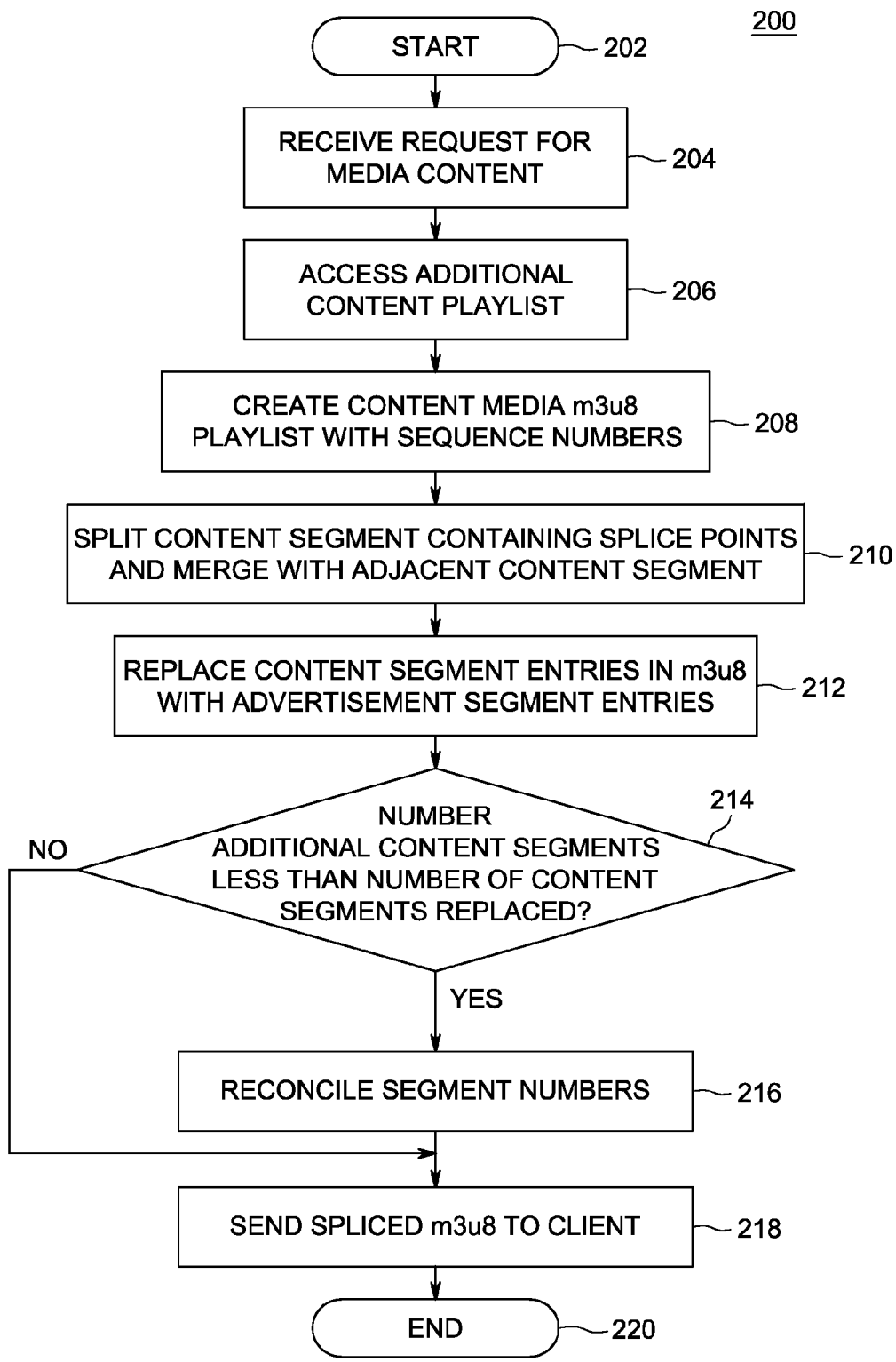
FIG. 2 depicts a flow diagram of a method for performing server-side splicing of streaming media content, as performed by the media splicer of FIG. 1, according to one or more embodiments.

FIG. 2 depicts a flow diagram of a method 200 for performing server-side splicing of streaming media content, as performed by the media splicer 122 of FIG. 1, according to one or more embodiments.

The method 200 starts at step 202, and proceeds to step 204. At step 204, the method 200 receives a request for media content. The method 200 proceeds to step 206.

At step 206, the method 200 selects an advertisement m3u8 playlist for splicing into the media content. An advertisement may be selected based on various parameters such as time of day, geographical region of the client, context (or theme) of the main content, and the like. A constraint for selecting the advertisement is that the total number of segments should not exceed the number of main content segments that are replaced. A typical AD playlist may be:
EXTM3U
EXT-X-VERSION:4
EXT-X-TARGETDURATION:10
EXT-X-MEDIA-SEQUENCE:1
EXTINF:10,
segmentA1.ts
EXTINF:10,
segmentA2.ts
EXTINF:10,
segmentA3.ts In this example, the ad playlist contains three segments, each ten seconds in duration, for a thirty-second advertisement. The method 200 proceeds to step 208.

At step 208, the method 200 creates a media content playlist with sequence numbers. The method 200 divides the media content into a series of small media content segments of equal duration, such that each segment is half the length of a target duration, which is typically ten seconds. The method 200 stores each media content segment in a separate file, typically a .ts file. The method 200 then creates an m3u8 playlist that contains URIs that define the location of each of the media content segments along with sequence numbers defining the order in which the media content segments are to be viewed.

The sequence numbers are assigned using the formula:

$$N=(T-S)/t$$

where t is the duration of each segment,
S is the stream start time,
T is the segment start time, and
N is the sequence number.
A typical m3u8 playlist file may be:
EXTM3U
EXT-X-VERSION:4
EXT-X-TARGETDURATION:10
EXT-X-MEDIA-SEQUENCE:13
EXTINF:5,
segment13.ts
EXTINF:5,
segment14.ts
EXTINF:5,
segment15.ts
EXTINF:5,
segment16.ts
EXTINF:5,
segment17.ts
EXTINF:5,
segment18.ts
EXTINF:5,
segment19.ts
EXTINF:5,
Segment20.ts
EXTINF:5,
Segment21.ts This file begins with sequence number 13, and contains nine segment URIs, each five seconds in duration. The method 200 proceeds to step 210. At step 210, the method 200 splits the media content segments that contain the splice-out and splice-in point and merges the split content segments with their adjacent media content segment. The method splits the media content segment containing the splice-out point i.e., the point in the media content segment where the media content is replaced with the advertisement content. The media content that is located in the media content segment before the splice-out point is merged with the media content in the media content segment immediately preceding the media content segment containing the splice-out point. For example, if the splice-out point is two seconds into segment14.ts. The segment14 is split. The first two seconds of segment14 is merged with the previous segment, namely segment13.ts. This new media content segment may be called, for example, segment13_1.ts and be seven seconds in duration. The remaining three second portion of segment 14 may be saved in segment14_1.ts. A requirement of live streaming is that no segment may be longer in duration than the target duration. Because all media content segments were created with a duration equal to half the target duration, merging parts of two segments will never violate this rule.

The method 200 determines the splice-in point, where the advertisement ends and the media content begins. Media content is replaced starting at the splice-out point and continuing for the duration of the advertisement content. For example, during a tennis match, there may be a 30-second advertisement to replace the time the players are taking a break. When streaming of the advertisement segments is complete, the live feed of the tennis match resumes. The place where the tennis match resumes is the splice-in point. The media content segment that contains the splice-in point is split at the splice-in point similar to how the segment is split at the splice-out point. The media content in the media content segment located before the splice-out point is merged with the media content in the media content segment immediately preceding the media content segment containing the splice-out point and the media content in the media content segment located after the splice-in point is merged with the media content segment immediately after the media content segment containing the splice-in point. This may generate new media content segments, namely segment20_1.ts that is seven seconds in duration and the remaining three seconds of segment21 are stored in segment21_1.ts. The m3u8 playlist file may be:
EXTM3U
EXT-X-VERSION:5
EXT-X-TARGETDURATION:10
EXT-X-MEDIA-SEQUENCE:13
EXTINF:7,
segment13_1.ts
EXTINF:3,
Segment14_1.ts

EXTINF:5,
segment15.ts
EXTINF:5,
segment16.ts
EXTINF:5,
segment17.ts
EXTINF:5,
segment18.ts
EXTINF:5,
segment19.ts
EXTINF: 2,
Segment20_1.ts
EXTINF:8,
segment21_1.ts The method 200 proceeds to step 212. At step 212, the method replaces the media content segment entries in the m3u8 playlist with advertisement entries from the AD m3u8 playlist. The URIs for the segments of the media content are replaced with URIs for the segments of the advertisement. Specifically, the 30 seconds of segment URIs from segment14_1.ts through segment20_1.ts are replaced with the three ten-second advertisement segment entries segmentA1.ts, segmentA2.ts, and segmentA3.ts. The new m3u8 containing the media content segment entries and the advertising segments entries may be:
EXTM3U
EXT-X-VERSION:4
EXT-X-TARGETDURATION:10
EXT-X-MEDIA-SEQUENCE:13
EXTINF:7,
segment13_1.ts
EXTINF:10,
segmentA1.ts
EXTINF:10,
segmentA2.ts
EXTINF:10,
segmentA3.ts
EXTINF:8,
segment21_1.ts The method 200 proceeds to step 214. At step 214, the method 200 determines whether the number of advertisement segments in the AD playlist is less than the number of media content segments that were replaced in the m3u8 playlist. If the number of advertisement segment URIs is less than the number of content media content segment URIs that were replaced, the sequence numbers will no longer be consecutive. In the present example, the file begins at sequence number 13, and should end at sequence number 21 with seven segments in between. If the number of advertisement segment URIs is not less than the number of content media content segment URIs that were replaced, the method 200 proceeds to step 218. If the number of advertisement segments is less than the number of media content segments that were replaced, the method 200 proceeds to step 216.

At step 216, the method 200 reconciles the sequence numbers in the m3u8 playlist. In one embodiment, the method 200 generates a dummy segment, for example, segmentD1.ts and adds segment entries of EXTINF 0.001 (of duration 0.001) that point to a dummy segment URL. This segment does not contain any audio or video data. The resulting m3u8 playlist file may be:
EXTM3U
EXT-X-VERSION:4
EXT-X-TARGETDURATION:10
EXT-X-MEDIA-SEQUENCE:13
EXTINF:7,
segment13_1.ts
EXTINF:10,
segmentA1.ts
EXTINF:10,
segmentA2.ts
EXTINF:10,
segmentA3.ts
EXTINF:0.001,
segmentD1.ts
EXTINF:0.001,
segmentD1.ts
EXTINF:0.001,
segmentD1.ts
EXTINF:0.001,
segmentD1.ts
EXTINF:8,
segment21_1.ts In another embodiment, the method 200 adds multiple segment entries to the modified media playlist that correspond to segments that are created from the media content segment that immediately followed the splice-in point. The media content segment is split into smaller segments. Each time the media content segment is split, an additional sequence number is created. The media content segment is repeatedly split until an appropriate number of sequence numbers is created. For example, instead of segment21_1.ts, the following files may be generated:
  segment21_1.ts of duration 8 seconds,
  segment21_01.ts, segment21_02.ts (a division of segment 21_1.ts, each of 4 seconds),
  segment21_001.ts, segment21_002.ts (a division of segment21_02.ts, each of 2 seconds)
  segment21_003.ts, segment21_004.ts (a division of segment21_001.ts, each of 1 second), segment 21_005.ts, segment21_006.ts (a division of segment21_002.ts, each 1 second)

If the difference in sequence numbering is 1, the #EXTINF:8, segment21_1.ts will be replaced by:
EXTINF:4
segment21_01.ts,
EXTINF:4
segment21_02.ts If the difference in sequence numbering is 2, the #EXTINF:8, segment21_1.ts will be replaced by
EXTINF:4
segment21_01.ts,
EXTINF:2
segment21_001.ts,
EXTINF:2
segment21_002.ts If the difference in sequence numbering is 3, the #EXTINF:8, segment21_1.ts will be replaced by
EXTINF:4
segment21_01.ts,
EXTINF:2
segment21_001.ts,
EXTINF:1
segment 21_005.ts,
EXTINF:1
segment21_006.ts The segment following the splice in point may be split even further into segments of duration 0.5 seconds in order to create additional sequence numbers as described above.

In yet another embodiment, multiple segment entries are added where each entry refers to the same segment with appropriate byte-range offsets applied. This list of different byte-range-offsets may be provided as a comment in the media content playlist. An EXT-X-BYTERANGE tag indicates that a media segment is a sub-range of the resource identified by its URI. The EXT-X-BYTERANGE tag only applies to the URI immediately following it in the playlist. The format of the EXT-X-BYTERANGE tag is:

EXT-X-BYTERANGE:<n>[@o]

where n is an integer indicating a length of the sub-range in bytes, and o, if present is an integer indicating the start of the sub-range, as a byte offset from the beginning of the resource.

If o is not present in the EXT-X-BYTERANGE tag, the sub-range begins at the next byte following the sub-range of the previous media segment.

A playlist will contain a comment, for example, #BYTER-ANGES:<list of numbers denoting lengths of sub-segments and durations of the sub-segments> just before the splice-in point. An example playlist may be:

EXTM3U
EXT-X-VERSION: 4
EXT-X-TARGETDURATION:10
EXT-X-MEDIA-SEQUENCE:13
EXTINF:5,
segment13.ts
EXTINF:5,
segment14.ts
EXTINF:5,
segment15.ts
EXTINF:5,
segment16.ts
EXTINF:5,
segment17.ts
BYTERANGES:17578,1.01,24340,1.34,10778,0.80, 34486,1.85
EXTINF:5,
segment18.ts
EXTINF:5,
segment19.ts After insertion of additional content, the playlist may be:

EXTM3U
EXT-X-VERSION:4
EXT-X-TARGETDURATION:10
EXT-X-MEDIA-SEQUENCE:13
EXTINF:5,
segment13.ts
EXTINF:10,
segmentA1.ts
EXTINF:10,
SegmentA2.ts
EXT-X-BYTERANGE:17578@0
EXTINF:1.01,
segment18.ts
EXT-X-BYTERANGE:69604@17578
EXTINF:3.99,
segment18.ts
EXTINF:5,
segment19.ts In this example, 69604 is the sum of the remaining sub-segments. The method 200 proceeds to step 218. At step 218, the method 200 sends the spliced m3u8 playlist to the client. The method 200 proceeds to step 220 and ends.

Embodiments of the present invention may be embodied as methods, apparatus, electronic devices, and/or computer program products. Accordingly, the embodiments of the present invention may be embodied in hardware and/or in software (including firmware, resident software, micro-code, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java.RTM, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Example Computer System

Figure 3:
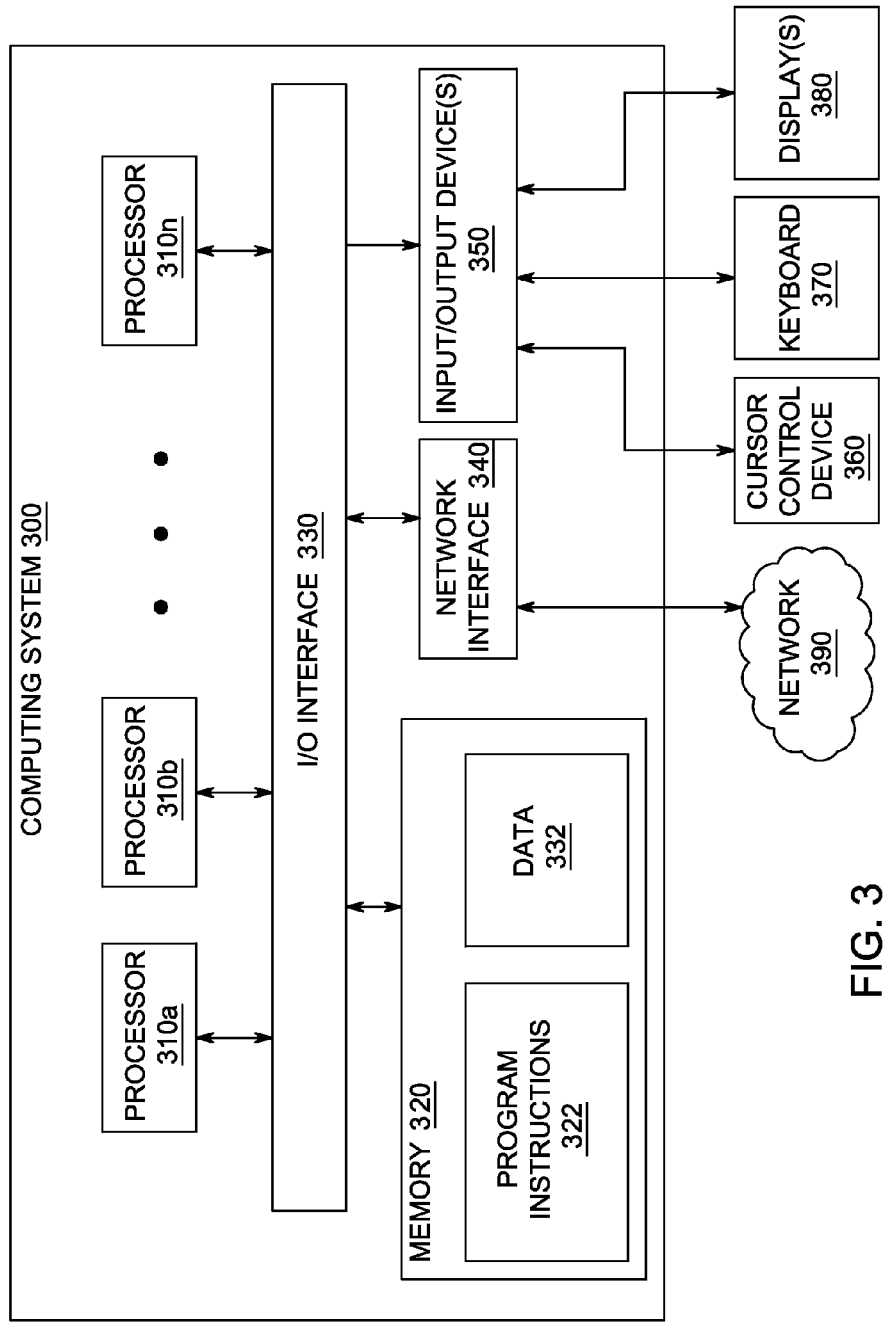
FIG. 3 depicts a computer system that is a computing device and can be utilized in various embodiments of the present invention, according to one or more embodiments.

FIG. 3 depicts a computer system that is a computing device and can be utilized in various embodiments of the present invention, according to one or more embodiments.

Various embodiments of an apparatus and method for performing server-side splicing for live streaming media based on specified properties and/or relationships, as described herein, may be executed on one or more computer systems, which may interact with various other devices. One such computer system is computer system 300 illustrated by FIG. 3, which may in various embodiments implement any of the elements or functionality illustrated in FIGS. 1-3. In various embodiments, computer system 300 may be configured to implement methods described above. The computer system 300 may be used to implement any other system, device, element, functionality or method of the above-described embodiments. In the illustrated embodiments, computer system 300 may be configured to implement method 200, as processor-executable executable program instructions 322 (e.g., program instructions executable by processor(s) 310a-n) in various embodiments.

In the illustrated embodiment, computer system 300 includes one or more processors 310a-n coupled to a system memory 320 via an input/output (I/O) interface 330. The computer system 300 further includes a network interface 340 coupled to I/O interface 330, and one or more input/output devices 350, such as cursor control device 360, keyboard 370, and display(s) 380. In various embodiments, any of components may be utilized by the system to receive user input described above. In various embodiments, a user interface (e.g., user interface) may be generated and displayed on display 380. In some cases, it is contemplated that embodiments may be implemented using a single instance of computer system 300, while in other embodiments multiple such systems, or multiple nodes making up computer system 300, may be configured to host different portions or instances of various embodiments. For example, in one embodiment some elements may be implemented via one or more nodes of computer system 300 that are distinct from those nodes implementing other elements. In another example, multiple nodes may implement computer system 300 in a distributed manner.

In different embodiments, computer system 300 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 300 may be a uniprocessor system including one processor 310, or a multiprocessor system including several processors 310 (e.g., two, four, eight, or another suitable number). Processors 310a-n may be any suitable processor capable of executing instructions. For example, in various embodiments processors 310 may be general-purpose or embedded processors implementing any of a variety of instruction set architectures (ISAs), such as the x96, PowerPC, SPARC, or MIPS ISAs, or any other suitable ISA. In multiprocessor systems, each of processors 310a-n may commonly, but not necessarily, implement the same ISA.

System memory 320 may be configured to store program instructions 322 and/or data 332 accessible by processor 310. In various embodiments, system memory 320 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 320. In other embodiments, program instructions and/or data may be received, sent or stored upon different types of computer-accessible media or on similar media separate from system memory 320 or computer system 300.

In one embodiment, I/O interface 330 may be configured to coordinate I/O traffic between processor 310, system memory 320, and any peripheral devices in the device, including network interface 340 or other peripheral interfaces, such as input/output devices 350. In some embodiments, I/O interface 330 may perform any necessary protocol, timing or other data transformations to convert data signals from one components (e.g., system memory 320) into a format suitable for use by another component (e.g., processor 310). In some embodiments, I/O interface 330 may include support for devices attached through various types of peripheral buses, such as a variant of the Peripheral Component Interconnect (PCI) bus standard or the Universal Serial Bus (USB) standard, for example. In some embodiments, the function of I/O interface 330 may be split into two or more separate components, such as a north bridge and a south bridge, for example. Also, in some embodiments some or all of the functionality of I/O interface 330, such as an interface to system memory 320, may be incorporated directly into processor 310.

Network interface 340 may be configured to allow data to be exchanged between computer system 300 and other devices attached to a network (e.g., network 390), such as one or more external systems or between nodes of computer system 300. In various embodiments, network 390 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 340 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 350 may, in some embodiments, include one or more display terminals, keyboards, keypads, touchpads, scanning devices, voice or optical recognition devices, or any other devices suitable for entering or accessing data by one or more computer systems 300. Multiple input/output devices 350 may be present in computer system 300 or may be distributed on various nodes of computer system 300. In some embodiments, similar input/output devices may be separate from computer system 300 and may interact with one or more nodes of computer system 300 through a wired or wireless connection, such as over network interface 340.

In some embodiments, the illustrated computer system may implement any of the methods described above, such as the methods illustrated by the flowchart of FIG. 2. In other embodiments, different elements and data may be included.

Those skilled in the art will appreciate that computer system 300 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, etc. Computer system 300 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 300 may be transmitted to computer system 300 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, etc.), ROM, etc.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method for performing server-side splicing for live streaming media, the method comprising:
   receiving a request for media content from a client computer;
   accessing a media playlist, wherein the media playlist comprises a respective universal resource identifier (URI) for each of a plurality of media content segments and consecutive sequence numbers defining an order in which the plurality of media content segments are to be viewed;
   accessing at least one additional content playlist for additional content to be spliced into the media content to be viewed;
   replacing some URIs of the media playlist with URIs of the at least one additional content playlist to create a modified media playlist; and
   correcting a gap in sequence numbers that occurs in the modified media playlist when a number of URIs of the at least one additional content playlist is less than a number of URIs of the media playlist that are replaced.

2. The method of claim 1, further comprising sending the modified media playlist to the client computer.

3. The method of claim 1, wherein the media playlist is an .m3u8 file and media content segments are .ts files.

4. The method of claim 1, wherein replacing comprises removing URIs corresponding to media content segments of the media playlist that are between a splice-out point and a splice-in point.

5. The method of claim 1, wherein correcting the gap comprises repeatedly splitting a media content segment located immediately following a splice-in point into segments of equal duration, wherein each split adds an additional sequence number to fill the gap in the modified media playlist, until the gap in the sequence numbers is replaced with consecutive sequence numbers.

6. The method of claim 1, wherein correcting the gap comprises adding a URI for each sequence number missing in the gap, wherein the URI points to a dummy media content segment in the modified media playlist that contains no data.

7. The method of claim 1, wherein correcting the gap comprises adding an additional URI for each sequence number missing in the gap, wherein each URI points to a same media content segment with a byte-range offset, wherein the byte-range offset references a sub-segment of the media content segment.

8. An apparatus for performing server-side splicing for live streaming media comprising:
   at least one processor,
   a memory operatively coupled to the at least one processor and containing instructions executable by the processor to perform media splicing by:
      accessing a media playlist containing URIs of a plurality of media content segments,
      accessing at least one additional content playlist containing URIs and sequence numbers for additional content to be spliced into a media content file to be viewed,
      replacing a plurality of media content URIs in the media playlist with the URIs of the at least one additional content playlist to create a modified media playlist, and
      correcting a gap in sequence numbers that occurs in the modified media playlist when a number of URIs of the at least one additional content playlist is less than a number of URIs of the media playlist that were replaced; and
   a network interface communicatively coupled to a network and operative to receive a request for media content from a client computer and deliver, to the client computer, live streaming media spliced according to instructions executed by the at least one processor.

9. The apparatus of claim 8, wherein the media playlist is an .m3u8 file and media content segments are .ts files.

10. The apparatus of claim 8, wherein the media content segments are split at splice points and merged with media content segments adjacent to the split media content segments.

11. The apparatus of claim 8, wherein correcting the gap comprises repeatedly splitting a media content segment located immediately following a splice-in point into segments of equal duration, wherein each split adds an additional sequence number to fill the gap in the modified media playlist, until the gap in the sequence numbers is replaced with consecutive sequence numbers.

12. The apparatus of claim 8, wherein correcting the gap comprises adding a URI for each sequence number missing in the gap, wherein the URI points to a dummy media content segment in the modified media playlist that contains no data.

13. The apparatus of claim 8, wherein correcting the gap comprises adding an additional URI for each sequence number missing in the gap, wherein each URI points to a same media content segment with a byte-range offset wherein the byte-range offset references a sub-segment of the media content segment.

14. A non-transitory computer readable medium for storing computer instructions that, when executed by at least one processor cause the at least one processor to perform a method for performing server-side splicing for live streaming media, the method comprising:
   receiving a request for media content from a client computer;
   accessing a media playlist, wherein the media playlist comprises a respective universal resource identifier (URI) for each of a plurality of media content segments and consecutive sequence numbers defining an order in which the plurality of media content segments are to be viewed;
   accessing at least one additional content playlist for additional content to be spliced into the media content to be viewed;
   replacing some URIs of the media playlist with URIs of the at least one additional content playlist to create a modified media playlist; and
   correcting a gap in sequence numbers that occurs in the modified media playlist when a number of URIs of the at least one additional content playlist is less than a number of URIs of the media playlist that are replaced.

15. The computer readable medium of claim 14, further comprising sending modified media playlist to the client computer.

16. The computer readable medium of claim 14, wherein the media playlist is an .m3u8 file and media content segments are .ts files.

17. The computer readable medium of claim 14, wherein replacing comprises removing URIs corresponding to media content segments of the media playlist that are between a splice-out point and a splice-in point.

18. The computer readable medium of claim 14, wherein correcting the gap comprises repeatedly splitting a media content segment located immediately following a splice-in point into segments of equal duration, wherein each split adds an additional sequence number to fill the gap in the modified media playlist, until the gap in the sequence numbers is replaced with consecutive sequence numbers.

19. The computer readable medium of claim 14, wherein correcting the gap comprises adding a URI for each sequence number missing in the gap, wherein the URI points to a dummy media content segment in the modified media playlist that contains no data.

20. The computer readable medium of claim 14, wherein correcting the gap comprises adding an additional URI for each sequence number missing in the gap, wherein each URI points to a same media content segment with a byte-range offset wherein the byte-range offset references a sub-segment of the media content segment.

* * * * *